United States Patent
Bittner et al.

(10) Patent No.: US 7,527,548 B2
(45) Date of Patent: May 5, 2009

(54) SYSTEM AND METHOD FOR PRECISION MACHINING OF HIGH HARDNESS GEAR TEETH AND SPLINES

(75) Inventors: Edward H. Bittner, Madison, CT (US); George D. Mitchell, Jr., Oxford, CT (US); Ronald S. Taylor, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 11/369,145

(22) Filed: Mar. 6, 2006

(65) Prior Publication Data

US 2006/0240746 A1    Oct. 26, 2006

Related U.S. Application Data

(60) Provisional application No. 60/660,424, filed on Mar. 10, 2005.

(51) Int. Cl.
   *B24B 1/00* (2006.01)
(52) U.S. Cl. ............... 451/47; 451/54; 451/70; 451/147; 451/219; 451/253; 451/900; 409/28; 409/31; 409/38
(58) Field of Classification Search ............ 451/47, 451/53, 54, 57, 58, 65, 69, 70, 147, 219, 451/253, 900, 249; 409/4, 9, 10, 13, 27, 409/28, 31, 33, 38, 39, 41, 5, 11, 40, 51
See application file for complete search history.

(56) References Cited

U.S. PATENT DOCUMENTS

| | | | | |
|---|---|---|---|---|
| 3,740,904 A | * | 6/1973 | Ainoura | ............ 451/47 |
| 3,909,990 A | * | 10/1975 | Tersch | ............ 451/47 |
| 4,565,474 A | * | 1/1986 | Charles | ............ 409/51 |
| 4,761,867 A | * | 8/1988 | Vollmer et al. | ............ 29/893.3 |
| 4,930,950 A | | 6/1990 | Stadtfeld | |
| 4,981,402 A | | 1/1991 | Krenzer et al. | |
| 5,116,173 A | | 5/1992 | Goldrich | |
| 5,136,522 A | * | 8/1992 | Loehrke | ............ 700/164 |
| 5,174,699 A | | 12/1992 | Faulstich | |
| 5,539,172 A | | 7/1996 | Takase et al. | |

(Continued)

FOREIGN PATENT DOCUMENTS

GB    2018178    *    4/1979

(Continued)

OTHER PUBLICATIONS

Bourn & Koch brochure, Gear Shaper Products.

*Primary Examiner*—Eileen P. Morgan
(74) *Attorney, Agent, or Firm*—Carlson, Gaskey & Olds PC

(57) ABSTRACT

A gear shaper machine system drives and maneuvers a hone tool to generate teeth geometry in a manner the teeth were machined prior to a hardening process. After heat treatment, the hone tool is indexed to the teeth geometry spacing of the workpiece so as to divide the stock removal evenly between the drive and coast sides. The hone tool may be driven with rotational and reciprocating synchronous teeth generating motion in which the hone tool reciprocates along the length of the teeth parallel to the centerline of the workpiece while the workpiece and hone tool rotate with synchronous motion.

22 Claims, 3 Drawing Sheets

U.S. PATENT DOCUMENTS

| | | |
|---|---|---|
| 5,580,298 A | 12/1996 | Stadtfeld |
| 5,651,721 A | 7/1997 | Schriefer |
| 5,800,103 A | 9/1998 | Stadtfeld et al. |
| 5,823,857 A | 10/1998 | Tan |
| 5,857,894 A | 1/1999 | Griesbach et al. |
| 6,120,355 A | 9/2000 | Stadtfeld et al. |
| 6,146,253 A | 11/2000 | Litvin et al. |
| 6,390,894 B1 | 5/2002 | Beel et al. |
| 6,669,415 B2 | 12/2003 | Stadtfeld et al. |
| 6,712,566 B2 | 3/2004 | Stadtfeld et al. |
| 6,905,292 B2 | 6/2005 | Schuon |

FOREIGN PATENT DOCUMENTS

| | | | |
|---|---|---|---|
| JP | 362162418 | * | 7/1987 |

* cited by examiner

SYSTEM AND METHOD FOR PRECISION MACHINING OF HIGH HARDNESS GEAR TEETH AND SPLINES

BACKGROUND OF THE INVENTION

The present application claims priority to U.S. Provisional Patent Application Ser. No. 60/660,424, filed 10 Mar. 2005.

The present invention relates to the precise manufacture of precision gear teeth and splines, and more particularly to a system and method to precisely hone heat treated gears and splines with a high hardness utilizing a gear shaper machine with Cubic Boron Nitride (CBN) tooling.

Machining is normally required on precision gear teeth after the heat treat process due to the distortion or warp induced on the workpiece by the heat associated with the heat treat process. Some distortion is an inherent and inevitable result of heat treatment. The distortion, however, is unacceptable on precision aerospace gears and splines when design tolerances are exceeded.

One method for machining precision gears in the hard state after the heat treat process is grinding with an abrasive wheel type media such as aluminum oxide or Cubic Boron Nitride (CBN) tooling. In many cases, however, it may not be possible to grind with a wheel type grinder due to part geometry limitations that may create an interference condition.

Lapping and honing methods have also been utilized but may have limited results because these machining methods may not provide the accuracy demanded in aerospace quality gears and splines. Typical lapping machines drive the workpiece at the headstock and the cutter tooling is then driven by the workpiece in an idler mode. This method tends to damage the involute form and may create an undesirable step condition in the root of the tooth. Lapping also cannot correct tooth to tooth spacing error, accumulated spacing error, lead error, involute error, concentricity error, or roundness errors. Typical computer numerically controlled honing machines are effectively utilized in some aerospace applications, but the machines may be cost prohibitive as such machines require vitrified type cutter tooling with diamond dressings.

Due to the limitations stated above, aerospace quality internal and external gears and splines are typically finish machined prior to the heat treat process with the expectation that the workpiece will not distort beyond desired design tolerances. Although effective, some percentage of the workpieces will distort beyond design tolerances and are scrapped due to the lack of an effective rework process.

Accordingly, it is desirable to provide a system and method to precisely machine aerospace quality gears and splines after a heat treat process which minimizes tooth to tooth spacing error, accumulated spacing error, lead error, involute error, concentricity error, roundness errors, pin size error or minor/major diameter errors to reduce scrap rates thereof.

SUMMARY OF THE INVENTION

A gear shaper machine system according to the present invention drives and maneuvers a hone tool to generate teeth geometry in a manner it was machined prior to the hardening process, except now the heat treated and hardened teeth geometry is machining with the even harder surface of the hone tool.

The hone tool is designed to be mountable within a machine spindle of a shaping machine system typical to the manufacture of aerospace quality internal and external gears and splines. The hone tool includes a hone holder and a Cubic Boron Nitride (CBN) coated hone.

In use, the honing tool is indexed to the teeth geometry spacing of the workpiece so as to divide the stock removal evenly between the drive and coast sides. The controller is programmed to generate the gear geometry using rotational and reciprocating motion to create involute teeth geometry as the teeth geometry was originally machined with the cutter tool. That is, the honing motion is generally similar to the original cutting motion as the same shaping machine system is utilized in both the machining and honing of the teething geometry.

The hone tool may be driven with rotational and reciprocating synchronous teeth generating motion in which the hone tool reciprocates along the length of the teeth parallel to the centerline of the workpiece while the workpiece and hone tool rotate with synchronous motion. Typical of teeth geometry machining, there is a back-off stroke between the cut stroke and the return stroke. Alternatively, the hone tool is maintained in mesh with the workpiece teeth geometry during both the cut stroke and the return stroke to minimize impact loadings and the potential for fracture of the CBN crystals.

Applicant has proven the benefits of this process on production aerospace gears which were previously considered scrap. Such scrap reduction and salvage achieves significant economic advantages.

The present invention therefore provides a system and method to precisely machine aerospace quality gears and splines after a heat treat process which minimizes tooth to tooth spacing error, accumulated spacing error, lead error, involute error, concentricity error, roundness errors, pin size error or minor/major diameter errors to reduce scrap rates thereof.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
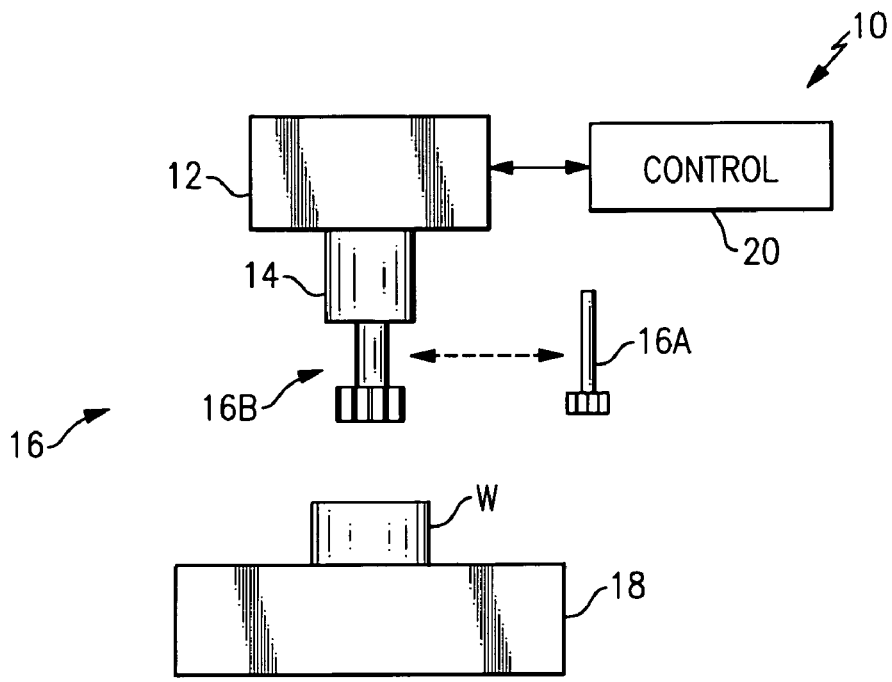
FIG. 1 is a general schematic view of a gear shaper machine system.

FIG. 1 illustrates a general block diagram of a gear shaper machine system 10 typical to the manufacture of aerospace quality internal and external gears and splines. It should be understood that although a gear with internal teeth geometry is disclosed in the illustrated embodiment, any workpiece which require the manufacture of teeth geometry typical of internal or external gears or splines will likewise benefit from the present invention.

The system 10 generally includes a machine head 12, a machine spindle 14, a replaceable tool 16, a workpiece fixture 18 and a controller 20 (illustrated schematically). Preferably, the system 10 utilizes a cutter tool 16A typical of a gear shaper machine that precisely generates the teeth geometry into the workpiece W in response to the controller 20 as generally understood. The controller 20 drives and maneuvers the cutter tool 16A to precisely generate the teeth geometry based on the relative motion between the workpiece and the cutter tool 16A as generally understood. The controller 20 is programmed to generate the gear geometry in the workpiece W with rotational and reciprocating synchronous teeth generating motion. Feeds, speeds and infeed depend upon the particular part design as generally understood such that the cutting motion is standard programming with data from the part design.

Figure 2:
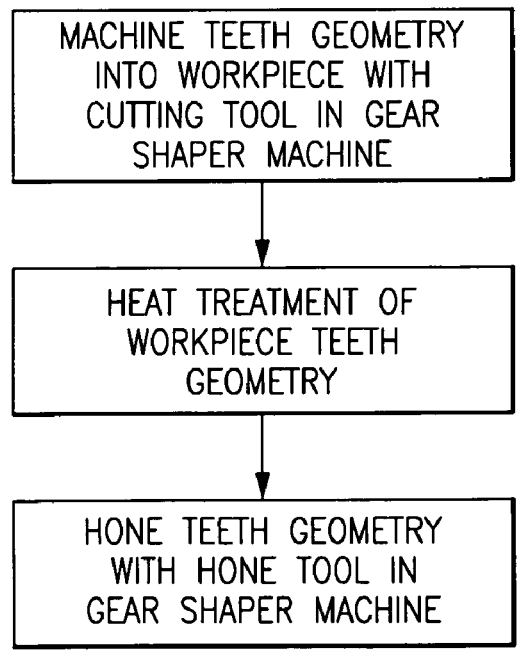
FIG. 2 is a block diagram of the method according to the present invention.

After the teeth geometry is machined into the workpiece, the workpiece W is heat treated in a conventional manner to a desire Rockwell hardness typically of 70 Rockwell "C" (FIG. 2). Distortion is often an inherent and inevitable result of heat treatment. The distortion, however, may be unacceptable on precision aerospace gears and splines should design tolerances be exceeded.

After the heat treating process, the workpiece W is reinstalled in the workpiece fixture 18 and the cutter tool 16A is replaced by a honing tool 16B. The controller 20 then again drives and maneuvers the hone tool 16B as the cutter tool 16A was maneuvered to machine the teeth geometry in the manner it was machined prior to the hardening process; except now the heat treated and hardened teeth geometry is machining with the even harder surface of the hone tool 16B (FIG. 2). The controller 20 is programmed to generate the teeth geometry in the workpiece W with the synchronous teeth generating motion of the cutter 16A but preferably with the gear mesh being maintained at all times.

Figure 3A:
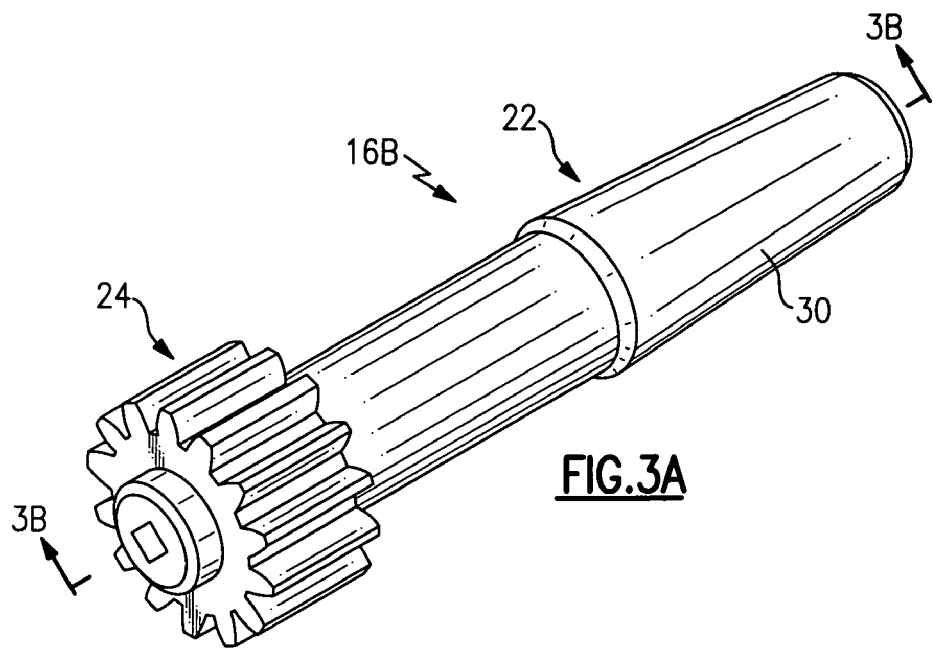
FIG. 3A is a perspective view of a hone tool.
Figure 3B:
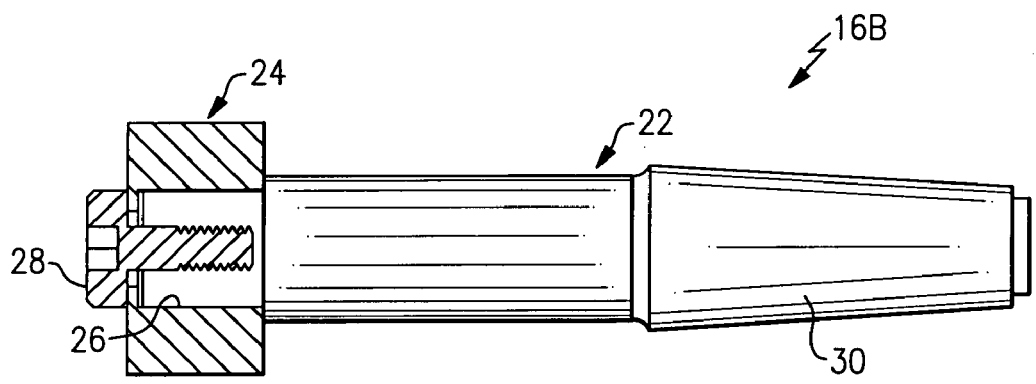
FIG. 3B is a sectional view of the hone tool of FIG. 3A taken along line 3A-3A.

Referring to FIG. 3A, the hone tool 16B is designed generally like a conventional shaper cutter as the hone tool 16B is mountable within the machine spindle 14 of gear shaper machine system 10 typical to the manufacture of aerospace quality internal and external gears and splines (FIG. 1). The hone tool 16B includes a hone holder 22 and a Cubic Boron Nitride (CBN) coated hone 24. It should be understood that other super abrasive materials may alternatively or additionally be utilized to coat the hone 24. The hone 24 may be mounted to the hone holder 22 in any conventional manner such as through splines 26 and a radial fastener 28 (FIG. 3B). It should be understood that various hones, coatings and attachment arrangements typical of the particular workpiece W will be usable with the present invention.

The hone holder 22 is preferably manufactured of a precision machined tool steel and precision ground to include a tapered shaft portion 30 which interfaces with the machine spindle (FIG. 1). The hone holder is preferably manufactured with a relatively large diameter which provides significant rigidity which precisely transfers the motion to the machine spindle 14 to the workpiece. That is, the hone holder 22 provides a rigid support not typical of cutter tools or other tool commonly utilized with the shaper machine system 10.

The hone 22 is preferably manufactured of a precision machined tool steel similar to a cutter tool for a desired teeth geometry but reduced to compensate for the thickness of the CBN crystals. A nickel electroplate method is preferably utilized to bond the CBN crystals to the steel hone holder 22.

Figure 4:
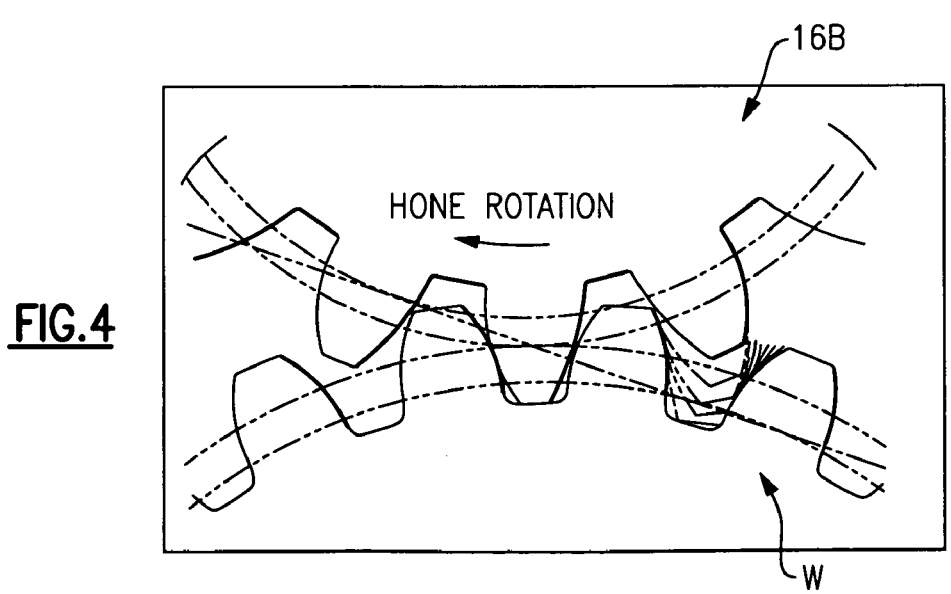
FIG. 4 is an expanded view of a spline and hone tool rotating in mesh generating teeth geometry.

In use, the honing tool 16B is indexed to the teeth geometry spacing of the workpiece W so as to divide the stock removal evenly between the drive and coast sides (FIG. 4). As discussed above, the controller 20 is programmed to generate the gear geometry using rotational and reciprocating synchronous teeth generating motion to create involute teeth geometry as the teeth geometry was originally machined with the cutter tool 16A. That is, the honing motion generally follows the original cutting motion (FIG. 4) since the same gear shaper machine system 10 is utilized for both the conventional teeth cutting and the novel teeth honing described herein. Feeds, speeds and infeed depend upon the particular part design. The basic motion is standard programming with data from the part design.

Figure 5:
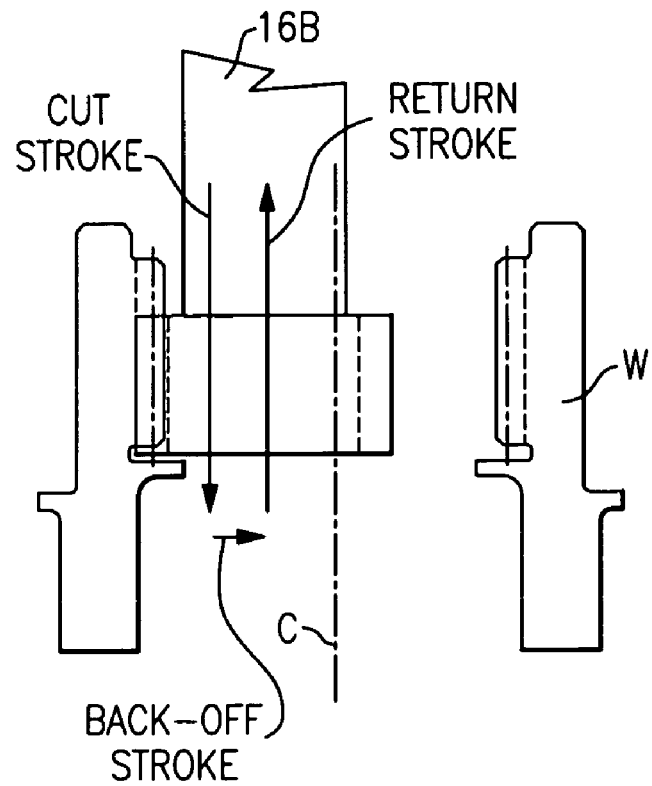
FIG. 5 is a graphical representation of the hone tool reciprocating synchronous teeth generating motion with a back-off stroke.

Referring to FIG. 5, the hone tool 16B may be driven with rotational and reciprocating synchronous teeth generating motion. That is, the hone tool 16B reciprocates along the length of the teeth parallel to the centerline C of the workpiece W while the workpiece and hone tool 16B rotate with synchronous motion. Typical of teeth geometry machining, there is a back-off stroke between the cut stroke and the return stroke.

Figure 6:
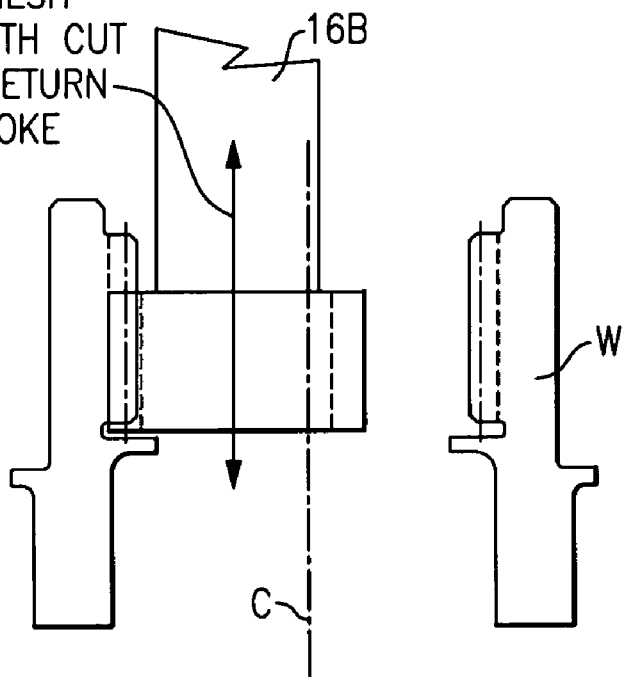
FIG. 6 is a graphical representation of the hone tool reciprocating synchronous teeth generating motion which maintains the hone in mesh with the teeth geometry.

Alternatively, the hone tool 16B is maintained in mesh with the workpiece teeth geometry during both the cut stroke and the return stroke (FIG. 6). Applicant has determined that by eliminating the "back-off" stroke motion, impact loadings are reduced and the potential for fracture of the CBN crystals is minimized. To provide this motion, the back-off cam in the machine 10 (FIG. 1) is removed and replaced with a cam having a no-rise follower.

Applicant has proven the benefits of this process on production aerospace gears which were previously considered scrap. Such scrap reduction and salvage achieves significant economic advantages.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of manufacturing teeth geometry in a workpiece comprising the steps of:
   (A) machining a teeth geometry in a workpiece with a cutting tool mounted within a gear shaper machine;
   (B) heat treating the teeth geometry after said step (A); and
   (C) honing the heat treated teeth geometry in the workpiece with a honing tool mounted within the gear shaper machine after said step (B), the honing tool comprising a hone having a plurality of teeth around an outer circumference of the hone, the teeth parallel to a longitudinal axis of the honing tool.

2. The method as recited in claim 1, wherein said step (C) further comprises:

(a) aligning the honing tool relative a tooth spacing of the teeth geometry to divide material removal evenly between a drive side and a coast side.

3. The method as recited in claim 1, wherein said step (C) further comprises:
(a) reciprocating the honing tool along a longitudinal axis of the honing tool parallel to a centerline of the workpiece.

4. The method as recited in claim 3, wherein said step (C) further comprises:
(b) maintaining a mesh between at least one of the plurality of teeth of the hone with the teeth geometry during both a cut and a return stroke of the honing tool.

5. The method as recited in claim 3, wherein said step (C) further comprises:
(b) maintaining at least one of the plurality of teeth of the hone in contact with the teeth geometry throughout said step (C).

6. The method as recited in claim 1, wherein said step (A) further comprises:
(a) machining the teeth geometry with synchronous teeth generating motion between the cutting tool and the workpiece.

7. The method as recited in claim 6, wherein said step (C) further comprises:
(a) honing the heat treated teeth geometry with synchronous teeth generating motion between the honing tool and the workpiece.

8. The method as recited in claim 6, wherein said step (C) further comprises:
(a) honing the heat treated teeth geometry with a synchronous teeth generating motion between the honing tool and the workpiece generally utilized in said step (A).

9. The method as recited in claim 1, wherein said step (C) further comprises:
(a) utilizing honing motion within said step (C) which generally follows the cutting motion of the cutting tool utilized in said step (A) with a reciprocating motion parallel to a centerline of the workpiece.

10. The method as recited in claim 9, wherein said step (a) further comprises:
(i) maintaining the honing tool in contact with the teeth geometry during both a cut stroke and a return stroke throughout said step (C).

11. The method as recited in claim 1, wherein honing the teeth geometry in the workpiece includes honing the teeth geometry of a hardened gear.

12. The method as recited in claim 11, wherein the hardened gear includes a hardened inner gear.

13. A method of manufacturing teeth geometry in a workpiece comprising the steps of:
(A) machining a teeth geometry in a workpiece with a cutting tool mounted within a gear shaper machine which provides a synchronous motion between a cutting tool and the workpiece;
(B) heat treating the teeth geometry after said step (A);
(C) reciprocating a honing tool mounted within the gear shaper machine in mesh with the heat treated teeth geometry with the synchronous motion of said step (A), said honing tool comprising a hone having a plurality of teeth around an outer circumference of the bone, the teeth parallel to a longitudinal axis of the honing tool, the mesh between at least one of the plurality of teeth of the bone and the heat treated teeth geometry.

14. The method as recited in claim 13, wherein said step (C) further comprises:
(a) maintaining the honing tool in contact with the teeth geometry throughout said step (C).

15. The method as recited in claim 13, wherein said step (A) further comprises:
(a) machining the teeth geometry in the workpiece with rotational and reciprocating synchronous teeth generating motion.

16. The method as recited in claim 13, wherein said step (C) further comprises:
(a) machining the heat treated teeth geometry in the workpiece with reciprocating motion parallel to a centerline of the workpiece; and
(b) rotating the workpiece relative the honing tool with the same synchronous motion of said step (A).

17. A system for manufacturing teeth geometry in a heat treated workpiece comprising:
a gear shaper machine having a machine spindle;
a cutting tool mountable within the machine spindle for machining a teeth geometry in a workpiece before heat treating;
a hone holder mountable within the machine spindle;
a hone mountable to said hone holder, said hone having a plurality of teeth around an outer circumference of said hone, said teeth parallel to a longitudinal axis of said hone holder; and
a controller in communication with said machine spindle to reciprocate said hone holder parallel to a centerline of a workpiece such that said at least one of said plurality of teeth of said hone remains in meshing engagement with the heat treated teeth geometry of the workpiece.

18. The system as recited in claim 17, wherein said controller directs said hone along a teeth geometry forming path.

19. The system as recited in claim 18, wherein said teeth geometry forming path includes synchronous relative rotation between the workpiece and said hone.

20. The system as recited in claim 17, wherein said hone is coated with CBN crystals.

21. The system as recited in claim 17, wherein said hone is gear-shaped.

22. The system as recited in claim 17, wherein the workpiece includes a hardened gear.

* * * * *

UNITED STATES PATENT AND TRADEMARK OFFICE
CERTIFICATE OF CORRECTION

PATENT NO.         : 7,527,548 B2  
APPLICATION NO. : 11/369145  
DATED                 : May 5, 2009  
INVENTOR(S)       : Bittner et al.

It is certified that error appears in the above-identified patent and that said Letters Patent is hereby corrected as shown below:

IN THE CLAIMS:

Claim 13, Column 6, Line 6: Change "bone" to read as --hone--

Claim 13, Column 6, Line 9: Change "bone" to read as --hone--

Claim 13, Column 6, Line 12: Insert --heat treated-- between "the" and "teeth"

Signed and Sealed this

Twenty-first Day of July, 2009

JOHN DOLL  
*Acting Director of the United States Patent and Trademark Office*